United States Patent
Alrutz

(10) Patent No.: US 10,484,748 B2
(45) Date of Patent: Nov. 19, 2019

(54) UPSTREAM NOISE SUPPRESSION CIRCUITS AND RELATED RADIO FREQUENCY SUBSCRIBER DROP EQUIPMENT AND METHODS

(71) Applicant: CommScope, Inc. of North Carolina, Hickory, NC (US)

(72) Inventor: Mark E. Alrutz, Taylorsville, NC (US)

(73) Assignee: CommScope, Inc., Hickory, NC (US)

( * ) Notice: Subject to any disclaimer, the term of this patent is extended or adjusted under 35 U.S.C. 154(b) by 0 days.

(21) Appl. No.: 15/797,677

(22) Filed: Oct. 30, 2017

(65) Prior Publication Data

US 2018/0249223 A1    Aug. 30, 2018

Related U.S. Application Data

(63) Continuation of application No. 14/592,993, filed on Jan. 9, 2015, now Pat. No. 9,807,467.

(60) Provisional application No. 61/929,595, filed on Jan. 21, 2014.

(51) Int. Cl.
*H04N 21/61* (2011.01)
*H04N 7/10* (2006.01)

(52) U.S. Cl.
CPC ......... *H04N 21/6168* (2013.01); *H04N 7/102* (2013.01); *H04N 21/6118* (2013.01)

(58) Field of Classification Search
CPC .... H04N 5/3559; H04N 5/3575; H04N 5/363; H04N 5/374; H04N 5/37452; H04N 5/378; H04N 9/045; H04N 2209/046; H04N 5/33; H04N 5/3651; H04N 5/367; H04N 5/3675; H04N 5/213; H04N 5/217; H04N 5/243

See application file for complete search history.

(56) References Cited

U.S. PATENT DOCUMENTS

| | | | |
|---|---|---|---|
| 6,160,990 A | 12/2000 | Kobayashi et al. | |
| 6,792,250 B1* | 9/2004 | Zarubin | H04B 1/0475 |
| | | | 327/105 |
| 7,746,194 B2 | 6/2010 | Rijssemus | |
| 8,141,122 B2 | 3/2012 | Alkan | |
| 8,181,211 B2 | 5/2012 | Olson et al. | |
| 8,213,457 B2 | 7/2012 | Kelma et al. | |
| 8,385,219 B2 | 2/2013 | Kelma et al. | |
| 8,479,247 B2 | 7/2013 | Shafer | |
| 9,807,467 B2 | 10/2017 | Alrutz | |
| 2010/0095344 A1 | 4/2010 | Newby et al. | |

(Continued)

FOREIGN PATENT DOCUMENTS

KR    10-2012-0025853 A    3/2012

OTHER PUBLICATIONS

Notification of Transmittal of the International Search Report and the Written Opinion of the International Searching Authority, or the Declaration, PCT/US2015/011499, dated Apr. 1, 2015.

*Primary Examiner* — Chenea Davis
(74) *Attorney, Agent, or Firm* — Merchant & Gould P.C.

(57) ABSTRACT

Upstream noise suppression circuits include a splitter and a combiner that are connected by first and second communications paths. An information signal removal circuit is provided on the second communications path and is configured to remove an upstream information signal therefrom. A phase shifter is also provided on the second communications path between the upstream information signal removal circuit and the combiner.

12 Claims, 6 Drawing Sheets

(56) References Cited

U.S. PATENT DOCUMENTS

2010/0251322 A1  9/2010  Palinkas et al.
2010/0251323 A1  9/2010  Jackson
2012/0044361 A1* 2/2012  Riggsby .................. H03H 7/48
                                                    348/192

* cited by examiner

UPSTREAM NOISE SUPPRESSION CIRCUITS AND RELATED RADIO FREQUENCY SUBSCRIBER DROP EQUIPMENT AND METHODS

CROSS-REFERENCE TO RELATED APPLICATIONS

This application is a continuation of application Ser. No. 14/592,993, filed Jan. 9, 2015, now U.S. Pat. No. 9,807,467, which application claims priority under 35 U.S.C. § 119 to provisional application Ser. No. 61/929,595, filed Jan. 21, 2014, which applications are incorporated herein by reference in their entirety.

FIELD OF THE INVENTION

The present invention is directed to cable television ("CATV") networks and, more particularly, to apparatus for cancelling upstream noise that funnels into CATV networks.

BACKGROUND

CATV networks refer to communications networks that are used to transmit cable television, telephone, broadband Internet signals and/or other information signals between one or more service providers and a plurality of subscribers, typically over coaxial and/or fiber optic cables. Most conventional CATV networks comprise hybrid fiber-coaxial networks in which fiber optic cables are primarily used to carry signals from the headend facilities of the service provider to various distribution points, while coaxial cable may be used, for example, to carry the signals into neighborhoods and to individual homes, apartment complexes, hotels, businesses, schools, government facilities and other subscriber premises (i.e., the physical locations of the subscribers).

Typically, the service provider is a CATV service provider that may have exclusive rights to offer cable television services in a particular geographic area. The service provider may broadcast a broad variety of CATV channels to the various subscriber premises over the CATV network. Most CATV service providers also offer other services such as, for example, broadband Internet service and digital telephone service. Thus, in many cases, a subscriber may receive CATV service, a broadband Internet connection, and Voice-over-Internet Protocol ("VoIP") telephone service all through a single connection over the CATV network between the service provider and the subscriber premise.

To provide these services to individual subscriber premises, radio frequency ("RF") tap units are typically connected in series along communications lines (e.g., a coaxial cable) of the CATV network. These tap units typically have an input port that connects to a first segment of the communications line, an output port that connects to a second segment of the communications line, and one or more RF tap ports. Each tap unit splits the signal that is received at its input port, allowing some of the received signal energy to pass through the tap unit to the output port (and thus the tap unit provides a communications path between the first and second segments of the communications line), while the remainder of the received signal energy is split further and provided to the RF tap ports of the tap unit. Cables, such as, for example, coaxial drop cables, may run between each RF tap port of a tap unit and a respective subscriber premise. In this manner, each RF tap port acts as a branch off of the communications line that is used to provide a communications path between the service provider and an individual subscriber premise over the CATV network. RF signals are transmitted through each RF tap port between the CATV network and an individual subscriber premise. Typically, a tap unit will include multiple tap ports (e.g., four or eight RF tap ports). Thus, each tap unit may be used to provide a communications path between a plurality of subscriber premises and the CATV network. Within the subscriber premise the received signal may be split further and fed to multiple devices, and may be amplified if required.

Two-way communications are typically supported between the CATV network and individual subscriber premises. The information that is transmitted from the CATV network headend facilities to the individual subscriber premises is typically referred to as the "downstream" and/or as the "forward path" communications, while communications from each subscriber premise to the CATV network headend facilities are typically referred to as "upstream" or "reverse path" communications. In a typical CATV network in the United States today, the downstream communications are transmitted over the 54-1002 MHz frequency band, while the upstream communications are transmitted over the 5-42 MHz frequency band. Other frequency bands are used in other countries, and modification of the above-referenced frequency bands in the United States is also under consideration. A signal amplifier is typically provided at each subscriber premise that may used to, among other things, amplify one or both of the downstream and/or upstream signals to compensate for signal loss that occurs on the coaxial cables that are connected between each tap unit and the individual subscriber premises or to compensate for the signal lost in splitting services between multiple devices in the subscriber premises.

Unwanted noise signals are often generated in individual subscriber premises, particularly at the lower end of the upstream frequency band. This noise may be generated, for example, by poor grounding, faulty equipment and/or improper installation of equipment and/or premise cabling. This noise funnels back into the CATV network. The proliferation of electronic devices that emit microwave signals (e.g., cellphones, cordless telephones, tablet computers, wireless routers, gaming devices, Bluetooth enabled equipment, etc.) has acted to increase the amount of noise that may funnel back into the network through faulty connections. This upstream noise can render portions of the upstream bandwidth essentially unusable (e.g., the 5-12 MHz frequency range), thereby limiting the bandwidth available for upstream communications. As CATV networks migrate to higher levels of data compression such as 64 or 128 QAM and/or implement DOCSIS 3.0 channel bonding signaling technologies in order to increase throughput, the upstream communications may become more sensitive to unwanted noise signals that are generated in individual subscriber premises.

SUMMARY

Pursuant to embodiments of the present invention, upstream noise suppression circuits are provided that include a radio frequency ("RF") splitter having an input port, a first output port and a second output port and an RF combiner having a first input port that is coupled to the first output port of the RF splitter, a second input port that is coupled to the second output of the RF splitter, and an output port. An information signal removal circuit is coupled between the second output of the RF splitter and the second input port of the RF combiner. The information signal removal circuit is configured to remove an upstream information signal from the second communications path. A phase shifter is coupled between an output of the upstream information signal removal circuit and the second input of the RF combiner. The connection between the first output port of the RF splitter and the first input port of the RF combiner comprises a first communications path, and the connection between the second output port of the RF splitter and the second input port of the RF combiner comprises a second communications path.

In some embodiments, the information signal removal circuit may include a burst detector that is configured to detect the upstream information signal. In such embodiments, the information signal removal circuit may further include a delay circuit that delays the upstream information signal by a predetermined amount of time. If provided, equivalent delay circuitry will be required on all communications paths. The information signal removal circuit may include a switching circuit that selectively diverts the upstream information signal from the second communications path in response to a control signal from the burst detector or a filter circuit that selectively filters the upstream information signal from the second communications path in response to a control signal from the burst detector. In other embodiments, a ground path component of the second communications path may be connected to the phase shifter and a signal carrying component of the second communications path is not connected to the phase shifter.

In some embodiments, the upstream noise suppression circuit may be part of an RF signal amplifier that includes first and second diplexers that separate upstream and downstream communications that are transmitted between the first and second diplexers onto separate upstream and downstream communications paths. In such embodiments, the upstream noise suppression circuit may be provided on the upstream communication path. The upstream and downstream communications paths may be part of a first communications path that amplifies the downstream signals, and the RF signal amplifier may further include a second communications path that is a passive, non-interruptible communications path. A second upstream noise suppression circuit may optionally be provided on the passive, non-interruptible communications path.

In some embodiments, the upstream noise suppression circuit may be part of an RF tap unit that includes an RF input port, an RF output port, a plurality of RF tap ports, a power divider network and a directional coupler having an input that is coupled to the RF input port, a first output that is coupled to the RF output port, and a second output that is coupled to the power divider network. In such embodiments, the upstream noise suppression circuit may be between the directional coupler and the power divider network. Alternatively, the upstream noise suppression circuit may be one of a plurality of upstream noise suppression circuits, and each of the upstream noise suppression circuits may be provided between a respective one of a plurality of outputs of the power divider network and a respective one of the RF tap ports.

Pursuant to further embodiments of the present invention, upstream noise suppression circuits are provided that include an RF splitter having an input port, a first output port and a second output port; an RF combiner having a first input port that is coupled to the first output port of the RF splitter, a second input port that is coupled to the second output of the RF splitter, and an output port. The connection between the first output port of the RF splitter and the first input port of the RF combiner comprises a first communications path, and the connection between the second output port of the RF splitter and the second input port of the RF combiner comprises a second communications path. A selective phase shifter circuit is coupled between the second output of the RF splitter and the second input of the RF combiner, the selective phase shifter circuit configured to selectively phase shift a signal on the second communications path.

In some embodiments, the selective phase shifter circuit may include a burst detector that is configured to detect the presence of an upstream information signal that is contained within the signal on the second communications path. The selective phase shifter circuit may phase shift the signal on the second communications path by approximately 180 degrees in response to the burst detector not detecting the presence of the upstream information signal. The selective phase shifter circuit may pass the signal on the second communications path without phase shifting the signal in response to the burst detector detecting the presence of the upstream information signal.

In some embodiments, the upstream noise suppression circuit is part of an RF signal amplifier that includes first and second diplexers that separate upstream and downstream communications that are transmitted between the first and second diplexers onto separate upstream and downstream communications paths. In such embodiments, the upstream noise suppression circuit may be provided on the upstream communication path. The upstream and downstream communications paths may be part of a first communications path that amplifies the downstream signals, and the RF signal amplifier may also include a second communications path that is a passive, non-interruptible communications path. A second upstream noise suppression circuit may be provided on the passive, non-interruptible communications path.

In other embodiments, the upstream noise suppression circuit may be part of an RF tap unit that includes an RF input port, an RF output port, a plurality of RF tap ports, a power divider network and a directional coupler having an input that is coupled to the RF input port, a first output that is coupled to the RF output port, and a second output that is coupled to the power divider network. In such embodiments, the upstream noise suppression circuit may be between the directional coupler and the power divider network. Alternatively, the upstream noise suppression circuit may be one of a plurality of upstream noise suppression circuits, and each of the upstream noise suppression circuits may be provided between a respective one of a plurality of outputs of the power divider network and a respective one of the RF tap ports.

Pursuant to still further embodiments of the present invention, methods of reducing upstream noise funneling in a communications network are provided in which an upstream signal is split into a first component that is transmitted over a first communications path and a second component that is transmitted over a second communications path, the second component including an information signal and a noise signal. The information signal is removed from the second component while at least a portion of the noise signal of the second component is retained to provide a modified second component. The modified second component is then phase shifted. Finally, the first component and the phase-shifted modified second component are recombined.

In some embodiments, removing the information signal from the second component while retaining at least a portion of the noise signal of the second component to provide a modified second component may involve (1) detecting the presence of the information signal, (2) terminating the second communications path in response to detecting the presence of the information signal, and (3) reestablishing the second communications path in response to detecting the absence of the information signal. A burst detector may be used to detect the presence of the information signal, and a switching circuit may be used to selectively terminate the second communications path. In other embodiments, removing the information signal from the second component while retaining at least a portion of the noise signal of the second component to provide a modified second component may comprise terminating a signal carrying component of the second communications path.

In further embodiments, removing the information signal from the second component while retaining at least a portion of the noise signal of the second component to provide a modified second component may involve (1) detecting the presence of the information signal, (2) using a filter circuit to remove the information signal in response to detecting the presence of the information signal while retaining a portion of the noise signal, and (3) bypassing the filter circuit in response to detecting the absence of the information signal. A burst detector may be is used to detect the presence of the information signal, and a switching circuit may be used to selectively filter the second communications path.

In some embodiments, the method may be performed on an upstream communications path of an RF signal amplifier. In other embodiments, the may be performed in an RF tap unit. The modified second component that is combined with the first component may be phase shifted by approximately 180 degrees with respect to the first component.

Pursuant to yet additional embodiments, methods of reducing upstream noise funneling in a communications network are provided in which an upstream signal is split into a first component that is transmitted over a first communications path and a second component that is transmitted over a second communications path. The second component is phase shifted if it is determined that the second component does not include an information signal. Then, the first component and the second component are recombined.

In some embodiments, a phase shifter circuit may be used to phase shift the second component. The phase shift may be a phase shifted of approximately 180 degrees.

DETAILED DESCRIPTION

Figure 1:
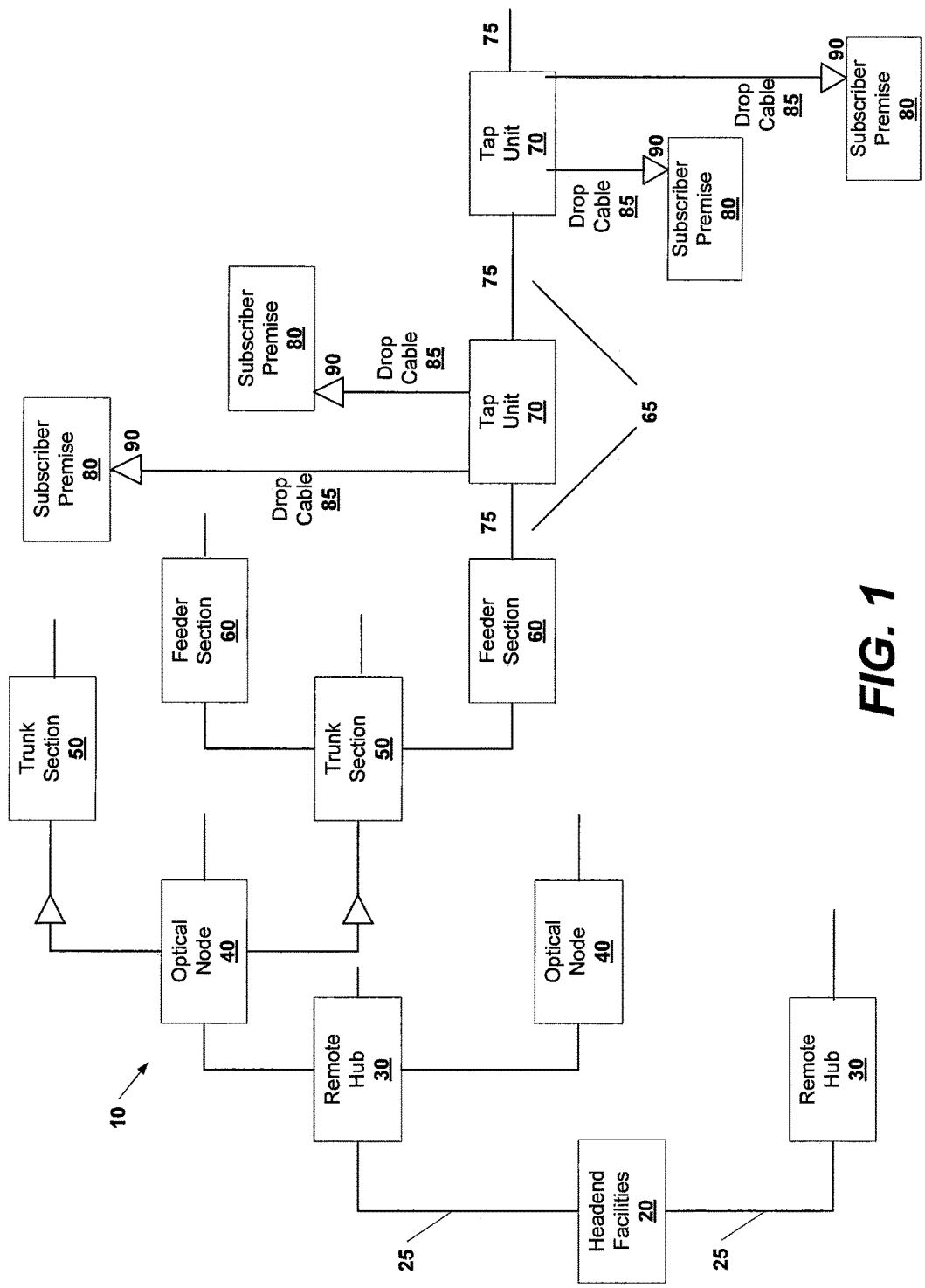
FIG. 1 is a simplified, schematic block diagram of a CATV network.

Pursuant to embodiments of the present invention, upstream noise suppression circuits are provided that may be used to reduce upstream noise funneling in a CATV network. The upstream noise suppression circuits according to embodiments of the present invention may operate by splitting an upstream signal into first and second equal magnitude components, removing the upstream information signal from the second component, phase-shifting the second component by 180 degrees, and then recombining the first and second components. As the information signal is removed from the second component, the second component will only include the upstream noise, and this noise signal is phase-shifted by 180 degrees. When the second component is recombined with the first component, the 180 degree phase-shifted noise signal of the second component may substantially cancel the noise signal included in the first component. Since the noise signals that are contained within the first and second components should be nearly identical signals, the recombination of the first component and the 180 degree phase-shifted second component may cancel much of the upstream noise that funnels into the network without negatively impacting the upstream information signal.

The information signal (if any) that is present in the second component may be removed in a variety of ways, including, for example, by selectively diverting the second component so that it bypasses the phase-shifter during periods when an information signal is present, by filtering the signals present on the second communications path when an information signal is present to remove the information signal, and/or by re-routing the second communications path (e.g., to ground through a matched termination) so that it is not re-combined with the first component during time periods when an information signal is present. In some embodiments, the upstream noise suppression circuit may use a burst detector to determine whether or not an upstream information signal is present within the second component. If it is, the second component is then (1) diverted to bypass the phase-shifter, (2) filtered to remove the upstream information signal or (3) re-routed so that it is not re-combined with the first component. However, when no upstream information signal is present, the second component is phase-shifted and recombined with the first component to cancel the noise signal that is present in the first component. Since upstream communications may only be occasionally transmitted from a subscriber premise (e.g., during an Internet session or a VoIP digital telephone conversation), the burst detector may only occasionally sense upstream information signals, and hence may only occasionally divert, filter or re-route the second component. Thus, the upstream noise suppression circuits may effectively cancel noise that is funneling back into the network via the upstream communication path during times when no upstream information signal is being transmitted from the subscriber premise.

In other embodiments, the upstream information signal may be removed from the second component by, for example, not connecting the center conductor of a coaxial cable or coaxial connector that carries the second component to the phase-shifter. In such embodiments, the phase shifter will 180 degree phase-shift the noise that is carried on the ground path and this phase-shifted signal may then be recombined with the first component to cancel out a portion of the upstream noise.

Herein the term "burst detector" refers to a circuit that is configured to detect whether or not an upstream information signal is being transmitted from a subscriber premise (or from a group of subscriber premises).

As discussed above, signal amplifiers are often provided in subscriber premises to boost the received signal level in either or both the downstream and/or the upstream paths. The upstream noise suppression circuits according to embodiments of the present invention may be implemented in these signal amplifiers as a mechanism for reducing upstream noise funneling in CATV networks. However, many subscriber premises may not include a signal amplifier, and hence this approach would only work to reduce upstream funneling at the subset of subscriber premises that include signal amplifiers. Moreover, many CATV service providers are implementing upgrades to their networks that are designed to boost signal levels at the subscriber premises, and these upgrades may further reduce the number of subscriber premises having signal amplifiers. Accordingly, in some embodiments the upstream noise suppression circuits according to embodiments of the present invention may be included in signal amplifiers, while in other embodiments, the upstream noise suppression circuits may be included in RF tap units (with a circuit for each tap port, or a single upstream noise suppression circuit that is used to cancel upstream noise from all of the tap ports), implemented as separate stand-alone upstream noise suppression circuits, or included in other RF subscriber drop equipment.

FIG. 1 is a simplified, schematic block diagram of a CATV network. As shown in FIG. 1, the CATV network 10 includes headend facilities 20 where signals (e.g., broadcast and other signals) from various sources, such as transmissions from satellites, microwave, fiber optic and other sources, are gathered and processed for transmission over the CATV network 10. These signals are distributed via a main or "optical trunk" network 25 to a plurality of remote hubs 30. The signals may be further distributed from each remote hub 30 to a plurality of optical nodes 40, where the signals are typically amplified. Each optical node 40 may feed a plurality of coaxial trunk sections 50. Each coaxial trunk section 50 may feed a plurality of coaxial feeder sections 60. The communications lines 65 running from each feeder section 60 are routed through neighborhoods and the like. A plurality of tap units 70 are typically provided on each cable 65. The tap units 70 divide the communications lines 65 into a plurality of segments 75, which are typically implemented as hardline cable segments 75. The hardline cable segments 75 are used to connect adjacent tap units 70 in series. The tap units 70 are typically located outside, along a residential street, perhaps within an enclosure. Each tap unit 70 has one or more tap ports. Coaxial cable drop segments 85 are used to connect each tap port to one of a plurality of individual subscriber premises 80 such as, for example, single dwelling homes, multiple dwelling units, etc. As shown in FIG. 1, in most cases, a signal amplifier 90 may be provided at the subscriber premise 80, and the coaxial cable drop segment 85 may connect the tap unit 70 to the signal amplifier 90. Note that in FIG. 1 only two remote hubs 30, optical nodes 40, coaxial trunk sections 50 and feeder sections 60 are pictured to simplify the drawing, and downstream components are depicted off only one of these hubs, nodes or sections for the same reason.

It will be appreciated that the CATV network 10 depicted in FIG. 1 is greatly simplified. It will likewise be appreciated that the methods and systems according to embodiments of the present invention discussed below may be used with a wide variety of different CATV networks. Thus, it will be appreciated that the cable network 10 depicted in FIG. 1 and the systems and components depicted in the other figures of the present application are exemplary in nature, and are not intended to be limiting as to the scope of the present invention as defined in the claims appended hereto.

Figure 2:
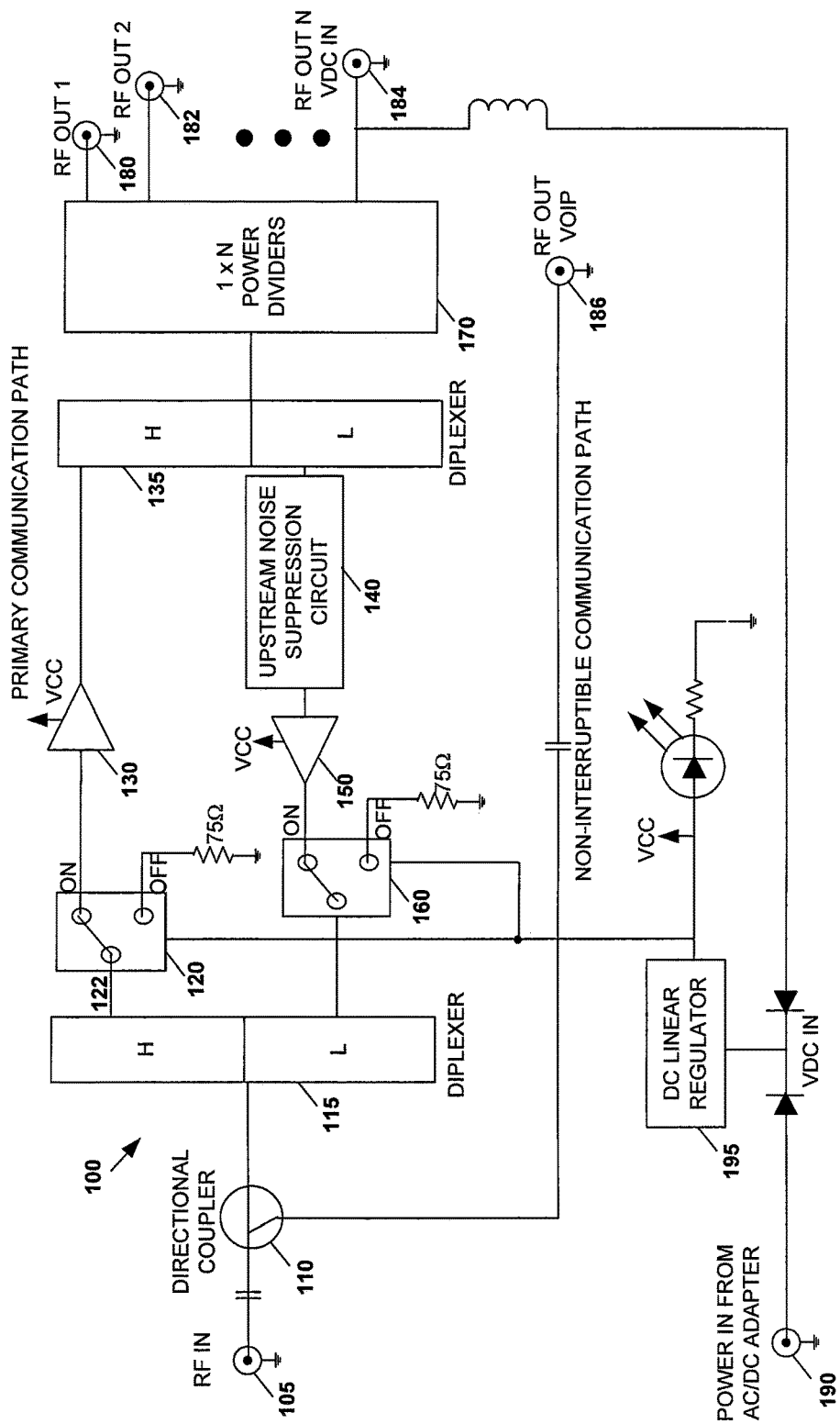
FIG. 2 is a block diagram of a signal amplifier according to certain embodiments of the present invention.

According to embodiments of the present invention, upstream noise suppression circuits are provided that may be used to reduce upstream noise funneling from individual subscriber premises into a CATV network such as CATV network 10. FIG. 2 is a block diagram of a bi-directional RF signal amplifier 100 that includes an upstream noise suppression circuit according to embodiments of the present invention. One or more of the signal amplifiers 90 in CATV network 10 of FIG. 1 could be implemented as a signal amplifier 100.

As shown in FIG. 2, the signal amplifier 100 includes an RF input port 105 that may receive downstream RF signals from a service provider and which may pass upstream RF signals in the reverse direction from the amplifier 100 through the port 105 to the service provider. A plurality of bi-directional output ports 180, 182, 184 and 186 are also provided that pass RF signals from the amplifier 100 to one or more devices (e.g., cable modems, televisions, Internet telephones, etc.) that are in communication with the output ports, and vice versa.

Signals received through input port 105 are passed through a passive directional coupler 110 to a primary communication path and to a non-interruptible communication path. Directional coupler 110 may either evenly or unevenly split the power of the input signals between the primary communication path and the non-interruptible communication path, depending on the design of the overall circuit. As shown in FIG. 2, the primary communication path includes a first high/low diplexer 115, a first SPDT non-latching relay 120, a downstream power amplifier 130, a second high/low diplexer 135, an upstream noise suppression circuit 140, an upstream power amplifier 150, a second SPDT non-latching relay 160, and a 1×N power divider circuit 170, which components connect the first output of the directional coupler 110 to the output ports 180, 182 and 184.

Downstream signals output by directional coupler 110 to the primary communication path are passed to the first high/low diplexer 115, which separates the high frequency downstream signals from any low frequency signals incident in the reverse direction. Diplexer 115 may, for example, filter the signals in a manner such that signals with frequencies greater than approximately 45-50 MHz are passed as high frequency downstream signals received from port 105, while signals with frequencies lower than 45 MHz are passed in the reverse direction as low frequency output signals received from ports 180, 182 and 184. Other frequency ranges may be used.

The downstream signals pass from the high-side of diplexer 115 to the input 122 of the non-latching relay 120. When the non-latching relay 120 is in the "ON" or "SET" state, these downstream signals then pass to power amplifier 130, which amplifies the signals, typically by a predetermined amount. The downstream signals pass from amplifier 130 to the second high/low diplexer 135. The output of diplexer 135 is then provided to the 1×N power divider circuit 170, where the downstream signal is split and distributed to output ports 180, 182, and 184.

Turning now to the reverse (upstream) signal flow through the primary communication path of amplifier 100, upstream signals received by the amplifier 100 from devices in communication with ports 180, 182 and/or 184 can be passed through the power divider circuit 170 where they are combined into a composite output signal. This composite output signal can be fed through the second high/low diplexer 135, which separates the low frequency upstream signals from any high frequency downstream signals incident in the forward direction. The diplexer 135 can, for example, filter the signals such that signals with frequencies greater than approximately 45-50 MHz are passed in the forward direction as high frequency downstream signals received from port 105, while signals with frequencies lower than this range are passed in the reverse direction as low frequency signals received from ports 180, 182, and/or 184.

The low frequency upstream signals pass from the low port of diplexer 135 to the upstream noise suppression circuit 140. The upstream noise suppression circuit 140 may be, for example, any of the upstream noise suppression circuits according to embodiments of the present invention that are disclosed herein, and may use active or passive noise cancelling techniques to cancel at least a part of any noise that funnels into signal amplifier 100 through ports 180, 182 and/or 184. Example implementations of the upstream noise suppression circuit 140 are described below with reference to FIGS. 3-7 and 10 below.

The upstream signals pass from the upstream noise suppression circuit 140 to power amplifier 150, which may amplify the upstream signals by, for example, a pre-determined amount. The upstream signals are then passed to non-latching relay 160. If the relay 160 is in its SET or ON position, the signals pass through the relay 160 to the low port of diplexer 115, through the directional coupler 110 to the input port 105 for transmission to the head end facilities of the CATV network.

During normal operation, the amplifier 100 can be powered from a power input port 190 and/or power that is reverse fed through RF OUT N/VDC IN port 184. In a typical installation at a subscriber's residence, it is contemplated that amplifier 100 may be powered by an AC/DC adapter receiving power provided by the residence (for example, 100-230 VAC, 50/60 Hz). As illustrated in FIG. 2, the power received from either power input 184, 190 can be provided to a voltage regulator 195 which supplies an operating voltage VCC to the downstream and upstream power amplifiers 130 and 150.

In the event that power to voltage regulator 195 is interrupted, voltage regulator 195 will be unable to provide an operating voltage VCC to power amplifiers 130 and 150. As a result, the power amplifiers 130, 150 will cease to function, and signals will no longer pass (in either direction) along the primary communication path.

In order to provide non-interruptible communications, signal amplifier 100 further provides a non-interruptible communication path between input port 105 and a Voice Over IP (VOIP) output port 186. As shown in FIG. 2, this non-interruptible communication path is provided between a second output of the directional coupler 110 and the VOIP output port 186. There are no active components along the non-interruptible communication path, and hence interruption of power to the signal amplifier 100 will not block signals that are transmitted over the non-interruptible communication path. Consequently, even if power is interrupted such that the power amplifiers 130, 150 are rendered inoperable, the non-interruptible communication path will still exist between RF input port 105 and VOIP port 186 which can be used to support communication of at least one or more services, such as emergency 911 telephone service. While not illustrated in FIG. 2, another pair of diplexers 115, 135 with a noise suppression circuit 140 therebetween may be provided on the non-interruptible communication path as well, between the second output of the directional coupler 110 and the RF output port 186. The additional diplexers 115, 135 and the additional noise suppression circuit 140 would be configured in the same manner as in the primary communications path, although the power amplifiers 130, 150 and the relays 120, 160 would be omitted on the non-interruptible communication path. Additionally, any active (i.e., powered) components in the noise suppression circuit, if provided, will be required to have a power down state that still passes signal, maintaining the non-interruptible feature of the non-interruptible communications path.

The operating voltage VCC that is output by voltage regulator 195 is provided to both relay 120 and relay 160. When the power to signal amplifier 100 is interrupted, the voltage VCC is no longer provided to relays 120 and 160, which causes these relays 120, 160 to switch from the normal signal path in the "ON" (or "SET") position to the "OFF" (or "RESET") position (or vice versa when power is resumed). The second output port of each relay 120, 160 (the "OFF" port) is connected to a matched resistive termination (here a 75 ohm resistor), and hence the first output of directional coupler 110 will be automatically coupled to 75 ohm terminations through the first diplexer 115 when power to signal amplifier 100 is cut-off. This can reduce signal degradation due to reflections and the like in order to provide improved signal quality on the second, non-interruptible communications path.

Figure 3:
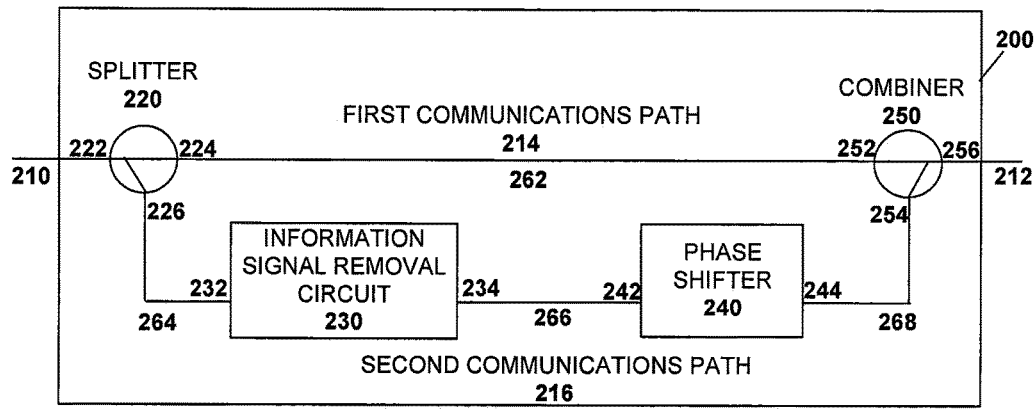
FIG. 3 is a block diagram of an upstream noise suppression circuit according to certain embodiments of the present invention that may be used in the signal amplifier of FIG. 2.

FIG. 3 is a block diagram of an upstream noise suppression circuit 200 according to certain embodiments of the present invention that may be used, for example, to implement the upstream noise suppression circuit 140 in the signal amplifier of FIG. 2.

As shown in FIG. 3, the upstream noise suppression circuit 200 comprises an input 210, an input splitter/combiner 220, an information signal removal circuit 230, a phase shifter 240, an output splitter/combiner 250 and an output 212. The input splitter/combiner 220 may comprise a three terminal device that has an input port 222 and first and second output ports 224, 226. The input port 222 of input splitter/combiner 220 may function as the input 210 of the upstream noise suppression circuit 200. The splitter 220 may comprise a conventional RF 1×2 splitter/combiner that evenly splits an RF signal received at the input port 222 into two, equal magnitude signals that are output through the output ports 224, 226. Output port 224 is in communications with an input port 252 of the output splitter/combiner 250 via a communications connection 262. Output port 226 of input splitter/combiner 220 is connected via a communications connection 264 to an input 232 of the information signal removal circuit 230. The output 234 of the information signal removal circuit 230 is connected by a communications connection 266 to an input 242 of the phase shifter 240. An output 244 of the phase shifter 240 is connected by a communications connection 268 to a second input 254 of the output splitter/combiner 250. The output 256 of the output splitter/combiner 250 may comprise the output 212 of the upstream noise suppression circuit 200. The communications connections 262, 264, 266, 268 may comprise, for example, coaxial cables, electrical connections on a printed circuit board or any other appropriate connections. The output splitter/combiner 250 may comprise a conventional RF 1×2 splitter/combiner that combines the RF signals that are received at its two input ports 252, 254 and then outputs the combined signal through its output port 256.

Figure 10:
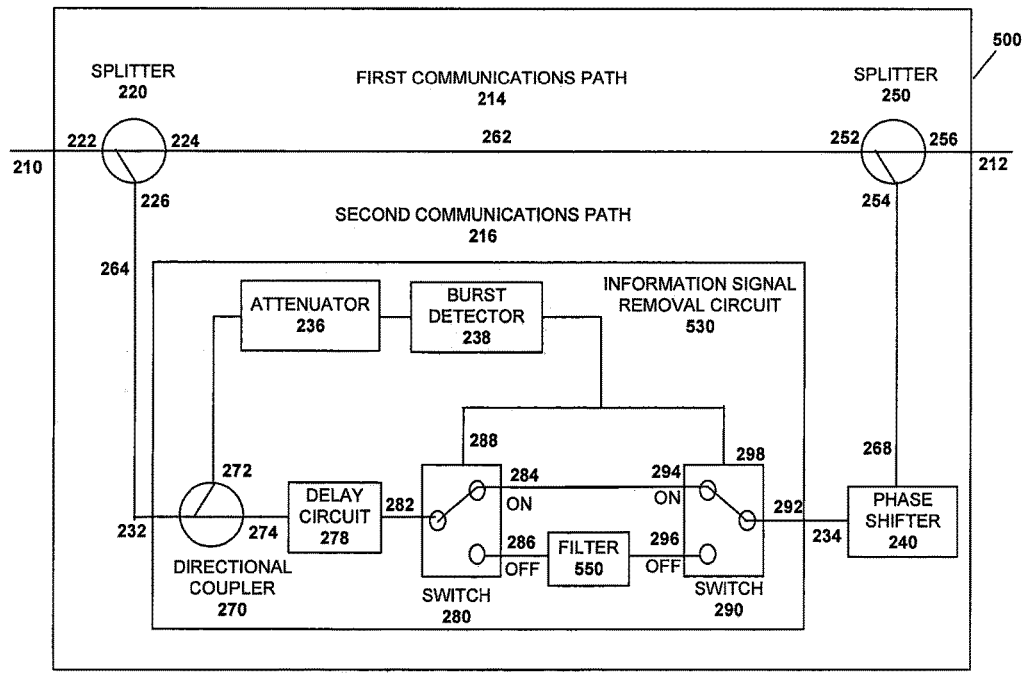
FIG. 10 is a block diagram of an information signal removal circuit according to still further embodiments of the present invention.

As shown in FIG. 3, the connections between the input and output splitter/combiners 220, 250 of upstream noise suppression circuit 200 define a first communications path 214 and a second communications path 216. The information signal removal circuit 230 may be configured to selectively or continuously remove any upstream information signal that is present on the second communications path 216. In some embodiments, the information signal removal circuit 230 may detect the presence of any upstream information signal that is present on the second communications path 216 and then re-route the signal from the second communications path 216 so that the signal is not recombined with the signal on the first communications path 214. In other embodiments, the information signal removal circuit 230 may always remove the information signal from the second communications path 216, while allowing much of the noise signal to pass along the second communications path 216. In still other embodiments, the information signal removal circuit 230 may detect the presence of any upstream information signal that is present on the second communications path 216 and then use a bandpass filter to remove the information signal from the second communications path 216 while leaving at least some of the noise signal. Examples of the first type of information signal removal circuit are illustrated in FIG. 4 and in FIG. 10 (when the filter 550 is a high pass filter), an example of the second type of information signal removal circuit is illustrated in FIG. 5, and an example of the third type of information signal removal circuit is illustrated in FIG. 10 (when the filter 550 is a bandpass filter).

Figure 4:
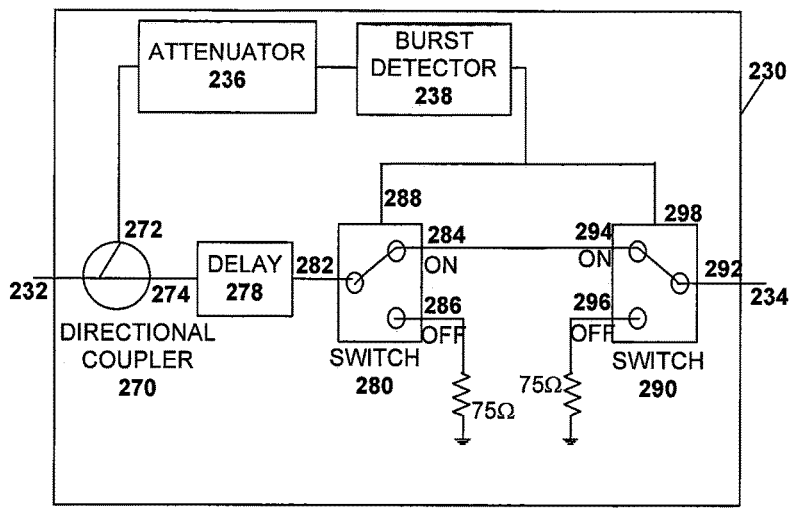
FIG. 4 is a block diagram of an information signal removal circuit according to embodiments of the present invention that may be used in the upstream noise suppression circuit of FIG. 3.
Figure 5:
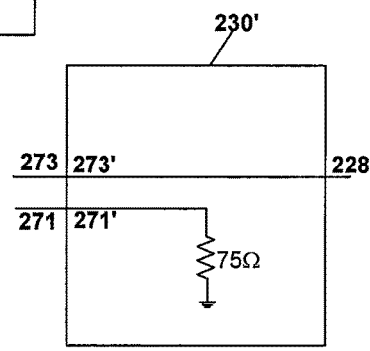
FIG. 5 is a block diagram of an information signal removal circuit according to further embodiments of the present invention that may be used in the upstream noise suppression circuit of FIG. 3.

Referring to FIG. 4, in some embodiments, the information signal removal circuit 230 may be implemented using a burst detector 238 that may detect when an upstream signal is present on the second communications path 216.

As shown in FIG. 4, the low frequency upstream signals that are received at the input 232 of the information signal removal circuit 230 are passed to a directional coupler 270. The directional coupler 270 splits off a small part of the received low frequency signal energy and passes it through a first output port 272 to an attenuator 236. The attenuator 236 feeds the signal energy to the burst detector 238, and may be used to reduce the signal level of these signals (if necessary). In some embodiments, the attenuator 236 may be omitted.

In most CATV networks, the upstream information signals comprise Time Division Multiple Access ("TDMA") signals in which multiple users share a frequency band by communicating only during a certain time slice of a communications frame. As a result, the upstream signals have a "bursty" nature in that the signals appear as a spike of signal energy in a certain frequency band (e.g., the 5-42 MHz frequency band) at spaced-apart time increments that correspond to a user's time slot in each of a series of communications frames. In some embodiments of the present invention the burst detector 238 may comprise a circuit that analyzes the spectrum of the upstream signal to identify when "bursts" of signal energy appear in a manner that suggests that upstream information signals are being transmitted from the subscriber premises 80 to the CATV network 10 via the RF signal amplifier 100 (see FIGS. 1-2).

The output of the burst detector 238 may be a control signal. When the burst detector 238 detects that an upstream information signal is being transmitted, the control signal output may take on a first value (e.g., logic 1), but will otherwise will have a second value (e.g., logic 0). The control signal output of burst detector 238 is provided to a pair of switching devices 280, 290. It will be appreciated that other control signal schemes may be used without departing from the scope of the present invention.

The remaining signal energy received at the input of the directional coupler 270 passes through a second output port 274 to a switching network. As shown in FIG. 4, the switching network may be implemented, for example, as two discrete switching devices 280, 290. In another exemplary embodiment (not shown), the switching network may be implemented as a single integrated switching device. Other designs are also possible. In some embodiments, the switching devices 280, 290 may comprise switches/relays (the terms "switch" and "relay" are used interchangeably herein) such as an SPDT non-latching relay. As shown in FIG. 4, in the depicted embodiment, the first switching device 280 includes an "input" port 282, first and second "output" ports 284, 286, and a control port 288. The switching device 280 is set to selectively connect input port 282 to one of the first and second output ports 284, 286, with the control signal that is input to port 288 controlling which of the output ports 284, 286 is connected to the input port 282. In particular, when the control signal that is input from the burst detector 238 to port 288 has the first logic value (indicating that upstream information signals are not present), the switching device 280 is set in its "ON" position to connect input port 282 to output port 284, thereby allowing the upstream signal energy to pass through the second communications path 216 of upstream noise suppression circuit 200. In contrast, when the control signal input to port 288 has the second logic value (indicating that upstream information signals are present), the switching device 280 is set in its "OFF" position to connect input port 282 to output port 286, where the upstream signal is fed to ground through a 75 ohm termination resistor.

The output port 284 of the first switching device 280 is connected to a first output port 294 of the second switching device 290. The second switching device 290 further includes a first input port 292, a second output port 296 and a control port 298. The second switching device 290 is configured so that when the control signal input to port 298 has the first logic value (indicating that upstream signals are not present), the switching device 290 is set in its "ON" position to connect input port 292 to output port 294, thereby allowing the upstream communications to flow from output port 284 of the first switching device 280 through the second switching device 290. In contrast, when the control signal input to port 298 has the second logic value (indicating that upstream information signals are present), the second switching device 290 is set in its "OFF" position to connect input port 292 to output port 296, which is connected to ground via a termination resistor.

As is further shown in FIG. 4, the information signal removal circuit 230 may also include a delay circuit 278. The delay circuit 278 may be configured to delay the upstream signal by a predetermined amount such as, for example, several microseconds to several tens of microseconds. The delay circuit 278 may be implemented, for example, as an acoustic wave element, a glass delay element or as any other appropriate delay element that is known to those of skill in the art. The delay circuit 278 may be provided because the control signal that is output from the burst detector 238 may not immediately trigger the switching devices 280, 290 to switch from their "ON" positions to their "OFF" positions when an upstream information signal is detected. The delay circuit 278 may be configured to delay the upstream information signal a sufficient amount so that the switching devices 280, 290 will have switched to their "OFF" positions before the upstream information signal reaches the switch 280. While not shown in the figures, a delay circuit such as circuit 278 may also be provided on the first communications path 214 of the upstream noise suppression circuit 200. The delay circuits may be set so that the components of the upstream signal that are split out onto the first and second communications paths 214, 216 will reach the output splitter/combiner 250 at the same time.

As noted above, the upstream information signals may comprise TDMA signals which are transmitted in a discrete slice of a communications frame. In some embodiments, if very precise timing is possible, the information signal removal circuit 230 may be designed to only control the switching devices 280, 290 to switch to their OFF positions during the specific time slots in each communication frame where upstream information signals are present. However, it will be appreciated that such embodiments may require very precise timing that may be impractical to implement in mass-produced subscriber equipment. Accordingly, in other embodiments, the switching devices 280, 290 may be controlled to switch to their OFF positions once the first burst of an upstream information signal is detected and to remain in their OFF positions until it is determined that the upstream information signal is no longer present.

As shown in FIG. 4, output port 286 of switching device 280 and output port 296 of switching device 290 are each coupled to ground through 75 ohm resistors that serve as matched terminations. As such, when the switching device 280 is in its "OFF" position, the second output port 274 of directional coupler 270 is connected to ground via a matched resistive termination that approximately matches the transmission path's impedance (in this case 75 ohms), and which will therefore substantially absorb the possible propagation modes with relatively minimal reflection. Reflections and interference into the subscriber premises 80 which may degrade the downstream communications can be reduced by including the matched termination on switching device 280. Similarly, the second output port 296 of switching device 290 is connected to ground via a matched resistive termination when the switching device 290 is in its "OFF" position. As such, the CATV network likewise will see a matched termination when the switching device 290 is in its OFF position, which can reduce signal reflection and interference back into the CATV network.

Referring now to FIGS. 3 and 4, operation of the upstream noise suppression circuit 200 will be described. As discussed above, an upstream signal that is received at the input 210 of upstream noise suppression circuit 200 is evenly split and passed along respective first and second communications paths 214, 216 by splitter 220. The component of the upstream signal that is on the first communications path 214 gets passed directly to splitter/combiner 250. The component of the upstream signal that is on the second communications path 216 is passed to the information signal removal circuit 230 which uses a burst detector 238 to detect if an upstream information signal is present and, if so, passes the signal on the second communications path 216 to ground through output port 286 of switching device 280. If no information signal is present, the signal on the second communications path 216 (which will only comprise noise) is passed through the information signal removal circuit 230 to the phase shifter 240. The phase shifter 240 shifts the phase of the signal by 180 degrees, and then feeds this phase shifted signal to the output splitter/combiner 250.

The output splitter/combiner 250 combines the signals received from the first and second communications paths 214, 216. If an upstream information signal is present, there will not be any signal on the second communications path 216, and hence all that is passed to the output 212 of the upstream noise suppression circuit 200 is the signal on the first communications path 214, which is a signal that comprises half the upstream information signal and half the upstream noise signal (assuming that splitter 220 is lossless in order to simplify the explanation). However, if an upstream information signal is not present, then both the signal on the first communications path 214, which will comprise half the upstream noise, and the signal on the second communications path 216, which will comprise the other half of the upstream noise, phase-shifted by 180 degrees, will be passed along the respective first and second communications paths 214, 216 to output splitter/combiner 250. When these two signals are combined at the output splitter/combiner 250, they will generally cancel each other out. Thus, in this case, the upstream noise can be substantially reduced or eliminated.

In the particular embodiment depicted in FIGS. 3 and 4, the switching devices 280, 290 are non-latching relays that require a DC power source. The burst detector 238 may also require a DC power source. As shown in FIG. 2, AC power may be input to the signal amplifier 100 to an AC/DC adapter 190 and provided to a conventional power circuit to supply DC power to the components of the signal amplifier 100 that require DC power.

The information signal removal circuit 230 of FIG. 4 operates by diverting the signal on the second communications path 216 anytime that an upstream information signal is present so that the upstream information signal is not phase-shifted by 180 degrees, as the phase shifted information signal would cancel out the non-phase-shifted component of the upstream information signal on the first communications path 214. As shown in FIG. 5, in other embodiments, information signal removal circuit 230 may be designed to always remove the upstream information signal.

In particular, as shown in FIG. 5, in other embodiments an information signal removal circuit may be provided in the form of a coaxial connector 230' that is attached to (or comprises) the output port 226 of input splitter/combiner 220. As is known to those of skill in the art, conventional RF subscriber drop units pass signals using coaxial cable and connectors where the information signal is transmitted on a center conductor of the cables/connectors and a conductive shield is provided that acts as a ground reference and that helps to reduce leakage of the information signal outside the connector. Much of the noise that may be injected along the upstream communications path may impinge upon, and be transmitted over, the conductive shield, which acts as the ground path transmission line. The two conductors that carry communications from the input port 222 to the output port 226 of splitter/combiner 220 are schematically represented in FIG. 5 as a signal carrying path 271 and a ground path 273. As is shown in FIG. 5, the output port 226 may be implemented so that it acts as an information removal circuit 230' by grounding the signal carrying path via a termination path 271' that is connected to ground via a 75 ohm termination resistor. The output port 226 may maintain the ground path 273 and pass it to the output 228 of output port 226. Thus, in this embodiment, the output port 226 is designed to act as an information signal removal circuit 230' that strips the upstream information signal from the second communications path 216 by connecting the center conductor of the coaxial transmission line to ground, while allowing the signal energy on the conductive shield to pass onto the second communications path 216 where this noise signal is phase shifted and then recombined with the signal that passes on the first communications path 214 at the output splitter/combiner 250. As much of the upstream noise may be present on the conductive shield, this noise may be cancelled by the phase shifting and recombination processes carried out by the phase shifter 240 and the output splitter/combiner 250.

Figure 6:
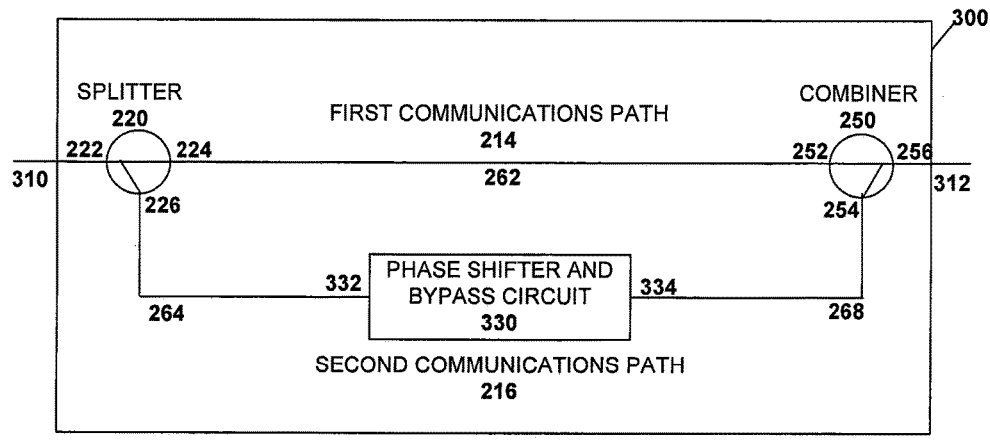
FIG. 6 is a block diagram of an upstream noise suppression circuit according to further embodiments of the present invention that may be used in the signal amplifier of FIG. 2.
Figure 7:
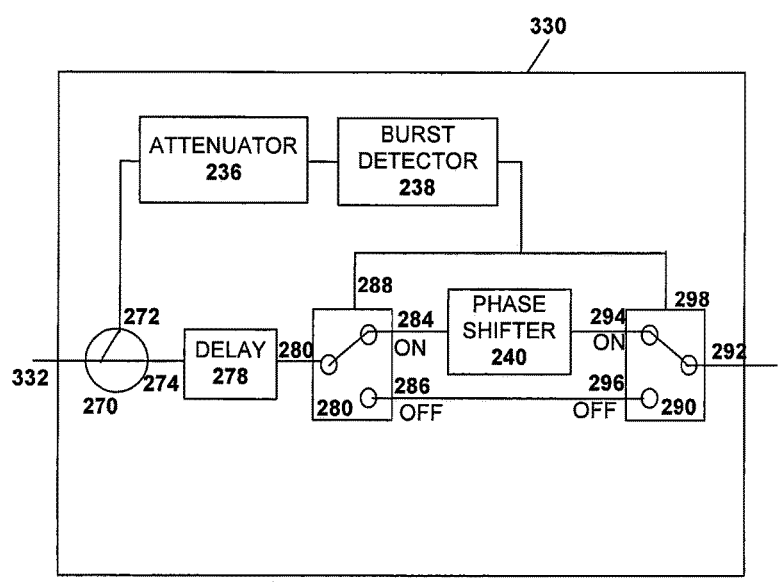
FIG. 7 is a block diagram of a phase shifter and bypass circuit that may be used in the upstream noise suppression circuit of FIG. 6.

FIG. 6 is a block diagram of an upstream noise suppression circuit 300 according to further embodiments of the present invention that may be used to implement the upstream noise suppression circuit 140 that is included in the signal amplifier of FIG. 2. FIG. 7 is a block diagram of a phase shifter and bypass circuit 330 that is included in the upstream noise suppression circuit 300 of FIG. 6.

As shown in FIG. 6, the upstream noise suppression circuit 300 is similar to the upstream noise suppression circuit 300 of FIG. 3, except that the information signal removal circuit 230 and phase shifter 240 of upstream noise suppression circuit 200 are replaced in noise suppression circuit 300 with a combined phase shifter and bypass circuit 330. FIG. 7 illustrates an embodiment of the phase shifter and bypass circuit 330. Operation of the upstream noise suppression circuit 300 will now be described with reference to FIGS. 6 and 7.

As shown in FIG. 7, the phase shifter and bypass circuit 330 is similar to the information signal removal circuit 230 of FIG. 4, except that the switching devices 280, 290 are configured so that the portion of the upstream signal on the second communications path 216 will always pass through the phase shifter and bypass circuit 330. The phase shifter and bypass circuit 330 uses a directional coupler 270, attenuator 236 and burst detector 238 to sample the upstream signal on the second communications path 216 and determine if an information signal is present thereon, in the exact same way that this is done in the information signal removal circuit 230 of FIG. 4. If no upstream information signal is detected, the burst detector 238 controls the switches 280, 290 so that they are in their "ON" position, and the upstream signal is fed to the phase shifter 240 where it is phase shifted by 180 degrees, and then is output to the output splitter/combiner 250 for combining with the component of the upstream signal that is on the first communications path 214. As discussed above, the noise signal on the first communications path 214 may then be substantially cancelled by the phase shifted noise signal on the second communications path 216, and upstream noise funneling may thereby be reduced.

If, instead, the burst detector 238 senses that an upstream information signal is present, the burst detector 238 then controls the switches 280, 290 so that they are in their "OFF" position. When this occurs, the component of the upstream signal on the second communications path 216 is passed through the phase shifter and bypass circuit 330 without any phase shift and output to the output splitter/combiner 250 for combining with the component of the upstream signal that is on the first communications path 214. In this case, the signals on the first and second communications paths 214, 216 will additively combine, such that almost the entirety of the upstream signal that was input to the upstream noise suppression circuit 300 will be output therefrom (with the only losses being the loss of the signal energy that is fed to the burst detector 238 and the insertion losses associated with the various RF components such as the splitter/combiners 220, 250, the directional coupler 270 and the switches 280, 290). Thus, the upstream noise suppression circuit 330 operates in a very similar manner to noise suppression circuit 230, but may exhibit less loss in upstream signal energy.

Figure 8:
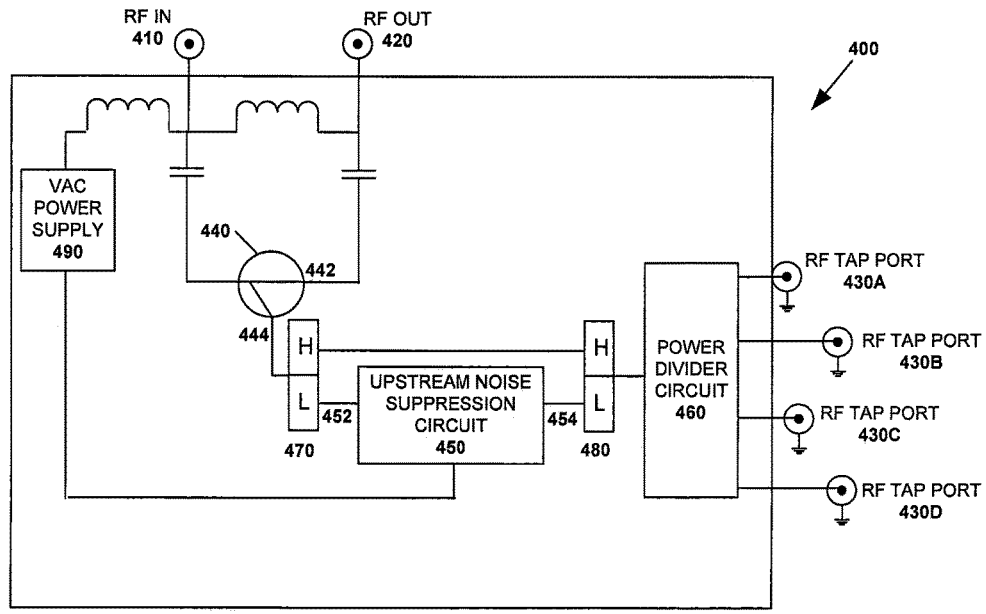
FIG. 8 is a block diagram of a tap unit that includes an upstream noise suppression circuit according to certain embodiments of the present invention.
Figure 9:
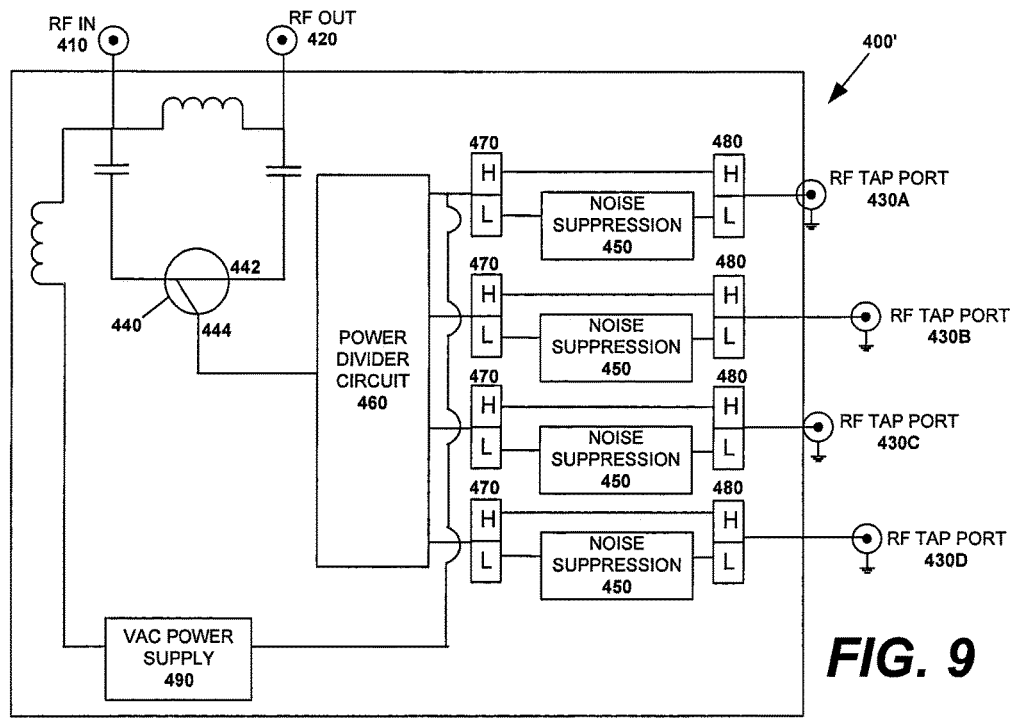
FIG. 9 is a block diagram of a tap unit that includes an upstream noise suppression circuit according to further embodiments of the present invention.

While the above-described embodiments of the present invention implement the upstream noise suppression circuits in signal amplifiers, it will be appreciated that the upstream noise suppression circuits may be implemented in other RF subscriber drop units such as tap units, or as stand-alone RF subscriber drop units. FIGS. 8 and 9 illustrate two tap units according to embodiments of the present invention that include upstream noise suppression circuits according to embodiments of the present invention.

As shown in FIG. 8, the tap unit 400 includes an RF input port 410, an RF output port 420, and a plurality of RF tap ports 430A-430D. The RF input port 410 may receive a hardline cable segment that connects the tap unit 400 to a drop section 60 (such as the leftmost hardline cable segment 75 in FIG. 1), or a hardline cable segment that connects the tap unit 400 to another tap unit 400 (such as the rightmost or middle hardline cable segments 75 in FIG. 1). The RF input port 410 and RF output port 420 facilitate connecting the tap unit 400 in series along the communications line 65 that extends from the drop section 60 (see FIG. 1) so that a plurality of tap units 400 may be connected to the same drop section 60 along the communications line 65 that comprises a plurality of cable segments 75.

As is further shown in FIG. 8, the tap unit 400 includes a directional coupler 440, an upstream noise suppression circuit 450, and a pair of diplexers 470, 480. The diplexers 470, 480 may be identical to the diplexers 115, 135 in FIG. 2 and hence further discussion thereof will be omitted. The directional coupler 440 has a first output 442 and a second output 444. The directional coupler 440 splits the RF signal that is received at the RF input port 410. Typically, the directional coupler 440 will be configured to pass most of the signal energy input at RF input port 410 through the first output 442 to the RF output port 420, while the remaining signal energy is passed through the second output 444 to the upstream noise suppression circuit 450 via the first diplexer 470. Thus, the directional coupler 440 is used to split off a small portion of the signal energy received at the RF input port 410 that will be fed to the subscriber premises 80 that are connected to the CATV network 10 through the tap unit 400. The remaining signal energy that passes to the RF output port 420 may be passed along hardline cable segment(s) 75 to one or more additional downstream tap units 400 (see FIG. 1). The directional coupler 440 also acts to combine upstream communications from the subscriber premises 80 that are connected to the CATV network 10 through the tap unit 400 with other upstream communications that are carried on communications line 65 for transmission to the headend facilities of the CATV network 10. As known to those of skill in the art, the amount of energy that the directional coupler 440 ideally passes into the tap unit 400 depends upon a variety of factors, such as the distance of the tap unit 400 from the last amplifier in the CATV network 10, the distance of the tap unit 400 from the subscriber premises 80 that the tap unit 400 serves, the number of tap ports on the tap unit 400, etc.

The diplexers 470, 480 may be identical to the diplexers 115, 135 in FIG. 2. The diplexers 470, 480 are used to separate the upstream signals from the downstream signals so that the upstream noise suppression circuit 450 only operates on the upstream signals.

As is further shown in FIG. 8, the upstream noise suppression circuit 450 is connected to an input of a power divider network 460 through the diplexer 480. The power divider network 460 may comprise, for example, a layered network of directional couplers that further divide the received RF input signal into a desired number of signals. The power divider network 460 divides the forward path RF signal so that a portion of this forward path signal is received at each of the outputs of the power divider network 460. Likewise, with respect to upstream communications, the power divider network 460 combines these RF signals into a composite RF signal. Typically, the directional couplers used in the power divider network 460 comprise splitters. While a 1×4 power divider network 460 is depicted in FIG. 8, it will be appreciated that the power divider network 460 may have any number of outputs (e.g., 1×2, 1×4 and 1×8 power divider networks 460 may be used).

Each output of the power divider network 460 is connected to one of the plurality of bi-directional RF tap ports 430A-D. Respective coaxial cables 85 connect each bi-directional RF tap port 430A-D to a respective subscriber premise 80 (see FIG. 1). Each bi-directional RF tap ports 430A-D may be used to pass RF signals from the tap unit 400 a subscriber premise 80, and to pass signals from the respective subscriber premises 80 to the tap unit 400.

The tap unit 400 may further include a VAC power supply 490. The power supply 490 may receive an alternating current power signal that is transmitted over the CATV network 10 to, for example, power amplifiers and other equipment in network 10. The power supply 490 may generate and output a direct current voltage VCC (e.g., a 5 volt signal) that is used to power various components in the tap unit 400 such as, for example, various components of the upstream noise suppression circuit 450. The upstream noise suppression circuit 450 may comprise, for example, any of the upstream noise suppression circuits that are described herein.

Figure 11:
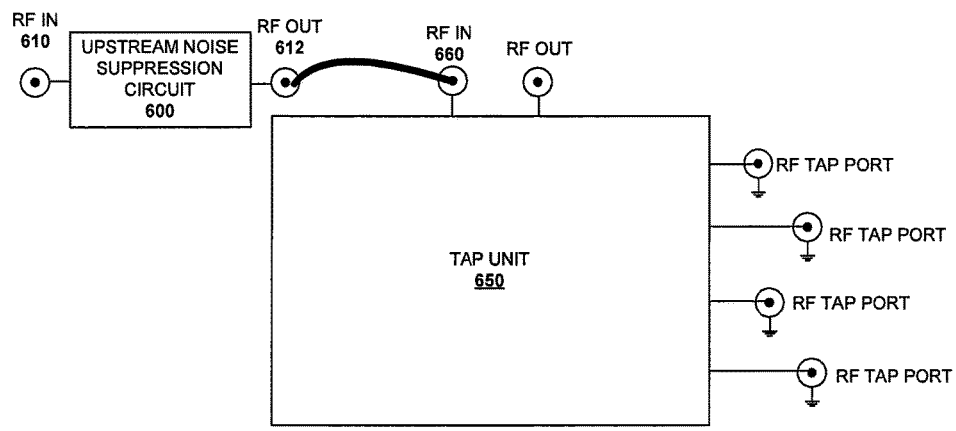
FIG. 11 is a block diagram that illustrates an implementation of an upstream noise suppression circuit as a separate stand alone device.

In still further embodiments, the upstream noise suppression circuit could be implemented separately from the tap unit. For example, FIG. 11 illustrates an embodiment in which an upstream noise suppression circuit 600 is implemented as a separate stand alone device. The upstream noise suppression circuit 600 includes an input port 610 and an output port 612. The circuitry of the upstream noise suppression circuit 600 is contained in a housing. The upstream noise suppression circuit 600 may be implemented, for example, as the upstream noise suppression circuit 200 of FIG. 3 or as the upstream noise suppression circuit 300 of FIG. 6. In the embodiment of FIG. 11, the upstream noise suppression circuit 600 is connected to the RF input port 660 of a tap unit 650, either directly or via a cabling connection. The tap unit 650 may be, for example, any conventional tap unit.

While FIG. 8 illustrates one exemplary tap unit 400 that includes an upstream noise suppression circuit 450 according to embodiments of the present invention, it will be appreciated that upstream noise suppression circuits 450 may be included in a wide variety of conventional or non-conventional tap unit designs.

For example, FIG. 9 is a block diagram of a tap unit 400' according to further embodiments of the present invention. As shown in FIG. 9, the tap unit 400' may include the exact same components as the tap unit 400. Accordingly, like components have been labeled using the same reference numerals as in FIG. 8 and operation of these components will not be further described here. The difference between the embodiments of FIGS. 8 and 9 is that in the embodiment of FIG. 8, a single upstream noise suppression circuit 450 and a single pair of diplexers 470, 480 are provided, while in the embodiment of FIG. 9 an upstream noise suppression circuit 450 and a pair of diplexers 470, 480 are provided for each output port 430 of the tap unit 400'. It will also be appreciated that in other embodiments the upstream noise suppression circuits 450 and diplexers 470, 480 of FIG. 9 may be replaced with a plurality of stand-alone upstream noise suppression circuits 600 (with integrated diplexers 470, 480) that are external to the tap unit 400' and that are connected to each of the RF tap ports 430A-430D.

The tap unit 400' of FIG. 9 may provide improved performance, particularly in tap units that include a large number of output ports. In particular, as discussed above, various of the upstream noise suppression circuits according to embodiments of the present invention use burst detectors to detect when an upstream information signal is present and do not perform any noise cancellation when such an information signal is present (e.g., by diverting the upstream signal on the second communications path 216 to ground) or perform more limited noise cancellation (e.g., by filtering out all signals in the upstream bandwidth on the second communications path, as will be discussed below with reference to FIG. 10). With the tap unit 100 of FIG. 8, if any of the output ports 430 have an upstream information signal present then the noise cancellation will not occur (or only incur in certain frequency bands). Assuming that each tap port has approximately the same amount of upstream traffic, this means that upstream noise cancellation will only occur potentially as little as only one fourth of the time as compared to the noise cancellation performed on the signal amplifier of FIG. 2. If upstream traffic is only present a small amount of the time (e.g., for 1 minute per hour), then this four-fold increase will not have a significant effect on the amount of upstream noise cancellation that occurs. However, if upstream traffic is present for more significantly amounts of time (e.g., 5 or 10 minutes per hour), then the four-fold decrease in the amount of noise cancellation that occurs may be very significant. The tap unit 400' of FIG. 9 provides an upstream noise suppression circuit 450 for each subscriber premise, and hence will not experience the reduction in noise cancellation that occurs with the tap unit 400 of FIG. 8. Implementation of the upstream noise suppression circuit as a separate stand alone unit that is connected to the RF input port of the tap unit as is done in the embodiment of FIG. 11 above would similarly not reduce noise as efficiently, since the upstream noise suppression circuit would be responsible for filtering noise from the tap unit that the upstream noise suppression circuit 600 is connected to as well as from and all downstream tap units and subscribers connected thereto.

Pursuant to still further embodiments of the present invention, upstream noise suppression circuits may be provided that remove the upstream information signal by filtering. FIG. 10 illustrates an example embodiment of this type of upstream noise suppression circuit.

As shown in FIG. 10, an upstream noise suppression circuit 500 may be provided that is similar to the upstream noise suppression circuit 200 of FIGS. 3-4. However, instead of terminating the signal on the second communications path 216 when it is determined that the signal includes an upstream information signal component, the signal on the second communications path 216 is instead routed through a filter 550. In some embodiments, the filter 550 may be a high pass filter that is designed to provide a high degree of filtering (e.g., 30 dB) for all frequencies below, for example, the highest frequency in the upstream frequency band (e.g., below about 42 MHz) so that the upstream information signal may be removed from the second communications path 216 by the high pass filter 550. In such embodiments, the filter 550 will remove the upstream information signal and the upstream noise from the second communications path 216 whenever an upstream information signal is present (i.e., the filter 550 provides the same result as terminating the upstream signal to a matched termination as is done in the embodiment of FIG. 4). In other embodiments, the filter 550 may comprise a bandpass filter that filters out signals in a frequency range where upstream carriers may be present. In many systems, upstream signals are only transmitted in a limited frequency range such as, for example, 18-42 MHz due to noise corruption below 18 MHz. The bandpass filter may be designed to filter out signals in the 18-42 MHz range while allowing the noise in, for example, the 0-15 MHz to pass even when an upstream information signal is present so that this noise signal may then by phase shifted 180 degrees by the phase shifter 240 so that the noise signal on the second communications path 216 will destructively combine with the noise signal present on the first communications path 214.

Embodiments of the present invention have been described above with reference to the accompanying drawings, in which embodiments of the invention are shown. It will be appreciated, however, that this invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements and/or components, but do not preclude the presence or addition of one or more other features, operations, elements, components and/or groups thereof.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

That which is claimed is:

1. A method of reducing upstream noise funneling in a communications network, comprising:
   splitting an upstream signal into a first component that is transmitted over a first communications path and a second component that is transmitted over a second communications path, the second component including an information signal and a noise signal;
   removing the information signal from the second component while retaining at least a portion of the noise signal of the second component to provide a modified second component;
   phase shifting the modified second component; and
   combining the first component and the phase-shifted modified second component;
   wherein removing the information signal from the second component while retaining at least a portion of the noise signal of the second component to provide a modified second component comprises:
   detecting the presence of the information signal;
   terminating the second communications path in response to detecting the presence of the information signal; and
   reestablishing the second communications path in response to detecting the absence of the information signal.

2. The method of claim 1, wherein a burst detector is used to detect the presence of the information signal, and wherein a switching circuit is used to selectively terminate the second communications path.

3. The method of claim 1, wherein terminating the second communications path comprises terminating a signal carrying component of the second communications path.

4. The method of claim 3, wherein a burst detector is used to detect the presence of the information signal, and wherein a switching circuit is used to selectively filter the second communications path.

5. The method of claim 1, wherein the method is performed on an upstream communications path of an RF signal amplifier.

6. The method of claim 1, wherein the method is performed in an RF tap unit.

7. The method of claim 1, wherein the modified second component that is combined with the first component is phase shifted by approximately 180 degrees with respect to the first component.

8. The method of claim 1, wherein a phase shifter circuit is used to phase shift the second component.

9. The method of claim 8, wherein the phase shift is phase shifted approximately 180 degrees.

10. The method of claim 8, wherein the phase shifter circuit includes a burst detector that is configured to detect the presence of the upstream signal that is contained within the second component on the second communications path.

11. The method of claim 1, wherein the method is performed on an upstream communications path of an RF signal amplifier.

12. The method of claim 1, wherein a switching circuit is used to selectively terminate the second communications path.

* * * * *